United States Patent
Wang

(10) Patent No.: US 9,740,045 B2
(45) Date of Patent: Aug. 22, 2017

(54) LIQUID CRYSTAL PANEL, METHOD OF MANUFACTURING LIQUID CRYSTAL PANEL, TRANSFLECTIVE DISPLAY DEVICE, AND A METHOD OF CONTROLLING DISPLAYING OF TRANSFLECTIVE DISPLAY DEVICE

(71) Applicant: BOE Technology Group Co., Ltd., Beijing (CN)

(72) Inventor: Xinxing Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 69 days.

(21) Appl. No.: 14/313,059

(22) Filed: Jun. 24, 2014

(65) Prior Publication Data
US 2015/0309365 A1    Oct. 29, 2015

(30) Foreign Application Priority Data
Apr. 28, 2014 (CN) .......................... 2014 1 0174880

(51) Int. Cl.
G02F 1/167      (2006.01)
G02F 1/1335    (2006.01)
G02F 1/133      (2006.01)

(52) U.S. Cl.
CPC .... G02F 1/133555 (2013.01); G02F 1/13318 (2013.01); G02F 1/167 (2013.01); G02F 2001/1678 (2013.01); G02F 2203/62 (2013.01)

(58) Field of Classification Search
CPC ............................................... G02F 2001/167
See application file for complete search history.

(56) References Cited

U.S. PATENT DOCUMENTS 5,724,109 A      3/1998  Nakamura et al.
6,621,541 B1 *   9/2003  Choi ................. G02F 1/133555
                                                      349/113

(Continued)

FOREIGN PATENT DOCUMENTS

CN    1768921 A    5/2006
CN    1963630 A    5/2007

(Continued)

OTHER PUBLICATIONS

First Office Action, including Search Report, for Chinese Patent Application No. 201410174880.4, dated Jan. 28, 2016, 10 pages.

(Continued)

*Primary Examiner* — Phu Vu
(74) *Attorney, Agent, or Firm* — Westman, Champlin & Koehler, P.A.

(57) ABSTRACT

The embodiment of the present invention discloses a transflective liquid crystal panel, a method of manufacturing the transflective liquid crystal panel, a transflective display device, and a method of controlling displaying of the transflective display device to solve the technical problems that the process for fabricating the reflection layer is complicated, the metal film of the reflection layer will cause electrostatic charges to be accumulated, and the surface of the reflection layer has an uneven concavo-convex shape so that the orientation of the liquid crystal molecules in the reflection region is adversely affected. The transflective liquid crystal panel comprises pixel units arranged in a matrix, a transmission region and a reflection region disposed in each pixel unit, and a reflection layer disposed in the reflection region. The reflection layer includes an electronic ink layer.

19 Claims, 6 Drawing Sheets

(56) References Cited

U.S. PATENT DOCUMENTS

| | | | | |
|---|---|---|---|---|
| 6,639,580 | B1* | 10/2003 | Kishi | G02F 1/167 345/105 |
| 6,750,844 | B2* | 6/2004 | Nakanishi | G02F 1/167 345/107 |
| 6,822,783 | B2* | 11/2004 | Matsuda | G02F 1/167 204/600 |
| 7,248,394 | B2* | 7/2007 | Ding | G02F 1/167 345/107 |
| 7,830,592 | B1* | 11/2010 | Sprague | G02B 5/0242 205/182 |
| 7,839,563 | B1* | 11/2010 | Luo | G02B 26/026 345/107 |
| 8,159,636 | B2* | 4/2012 | Sun | G02F 1/167 349/106 |
| 8,791,896 | B2* | 7/2014 | Kwon | G02F 1/167 345/107 |
| 8,847,207 | B2 | 9/2014 | Yoneya | |
| 2001/0030639 | A1* | 10/2001 | Goden | G02F 1/167 345/107 |
| 2003/0016429 | A1* | 1/2003 | Ikeda | G02F 1/167 359/238 |
| 2006/0087490 | A1* | 4/2006 | Ding | G02F 1/133377 345/107 |
| 2007/0103623 | A1 | 5/2007 | Chen | |
| 2010/0060628 | A1* | 3/2010 | Lenssen | G02F 1/167 345/214 |
| 2010/0084652 | A1* | 4/2010 | Yamazaki | H01L 27/1225 257/43 |
| 2010/0090943 | A1* | 4/2010 | Fricke | G09G 3/344 345/107 |
| 2011/0237025 | A1* | 9/2011 | Yamazaki | H01L 29/66742 438/104 |
| 2012/0154898 | A1* | 6/2012 | Kwon | G02F 1/167 359/296 |

FOREIGN PATENT DOCUMENTS

| | | |
|---|---|---|
| CN | 101872841 A | 10/2010 |
| CN | 201740953 U | 2/2011 |
| CN | 103576403 A | 2/2014 |
| CN | 103576405 A | 2/2014 |
| JP | 2009-75364 A | 4/2009 |

OTHER PUBLICATIONS

Second Office Action, including Search Report, for Chinese Patent Application No. 201410174880.4, dated Jun. 7, 2016, 10 pages.
Third Office Action, including Search Report, for Chinese Patent Application No. 201410174880.4, dated Oct. 21, 2016, 15 pages.

* cited by examiner

LIQUID CRYSTAL PANEL, METHOD OF MANUFACTURING LIQUID CRYSTAL PANEL, TRANSFLECTIVE DISPLAY DEVICE, AND A METHOD OF CONTROLLING DISPLAYING OF TRANSFLECTIVE DISPLAY DEVICE

CROSS-REFERENCE TO RELATED APPLICATION

This application claims the benefit of Chinese Patent Application No. 201410174880.4 filed on Apr. 28, 2014 in the State Intellectual Property Office of China, the whole disclosure of which is incorporated herein by reference.

BACKGROUND OF THE INVENTION

1. Field of the Invention

Embodiments of the present invention relate to the field of liquid crystal display, and particularly to a transflective liquid crystal panel, a method of manufacturing the transflective liquid crystal panel, a transflective display device, and a method of controlling displaying of the transflective display device.

2. Description of the Related Art

A transflective liquid crystal panel comprises a color filter substrate, an array substrate, and a liquid crystal located between the color filter substrate and the array substrate. The array substrate is formed with a plurality of pixel units. Each pixel unit is provided with a transmission region and a reflection region. A reflection layer is disposed in a corresponding area in the reflection region. In order that the reflection layer has a diffuse reflection capability to improve a displaying effect, as shown in FIG. 1, a conventional reflection layer 1 generally comprises a resin base 1a, a surface of which is etched in a concavo-convex shape, and a metal film 1b plated on the surface of the resin base 1a to reflect an ambient light.

During fabricating the reflection layer, it is necessary to etch the surface of the resin base in the concavo-convex shape, and then to plate the surface of the resin base with the metal film. Therefore, the process for fabricating the reflection layer is complicated. Furthermore, since the metal film of the reflection layer will absorb electrons free in the transflective liquid crystal panel, electrostatic charges will be accumulated. In addition, since the surface of the resin base and the metal film of the reflection layer have the uneven concavo-convex shape, and the orientation of the liquid crystal molecules in the reflection region is adversely affected, thereby reducing the displaying effect of the reflection region.

SUMMARY OF THE INVENTION

According to embodiments of the present invention, there is provided a transflective liquid crystal panel, a method of manufacturing the transflective liquid crystal panel, a transflective display device, and a method of controlling displaying of the transflective display device to simplify the process for fabricating the reflection layer, and prevent electrostatic charges from being accumulated.

In accordance with a first embodiment of the present invention, there is provided a transflective liquid crystal panel comprising pixel units arranged in a matrix, a transmission region and a reflection region disposed in each pixel unit, and a reflection layer disposed in the reflection region, wherein the reflection layer includes an electronic ink layer.

In accordance with a second embodiment of the present invention, there is provided a transflective display device comprising the liquid crystal panel mentioned above.

In accordance with a third embodiment of the present invention, there is provided a method of manufacturing a transflective liquid crystal panel comprising:

providing a first substrate and a second substrate;

forming pixel units, arranged in a matrix, on the first substrate, and disposing a transmission region and a reflection region in each pixel unit;

forming a reflection layer including an electronic ink layer in the reflection region in each pixel unit; and assembling the second substrate and the first substrate and disposing a liquid crystal between the first substrate and the second substrate to form the liquid crystal panel.

In accordance with a fourth embodiment of the present invention, there is provided a method of controlling displaying of the transflective display device comprising:

outputting a corresponding control signal to the timing controller by the external processor according to an intensity of the ambient light; and controlling the gate driver integrated circuit (IC), a source driver IC, and the electrode strip driver IC by the timing controller according to the control signal, respectively.

DETAILED DESCRIPTION OF THE EMBODIMENTS

Figure 1:
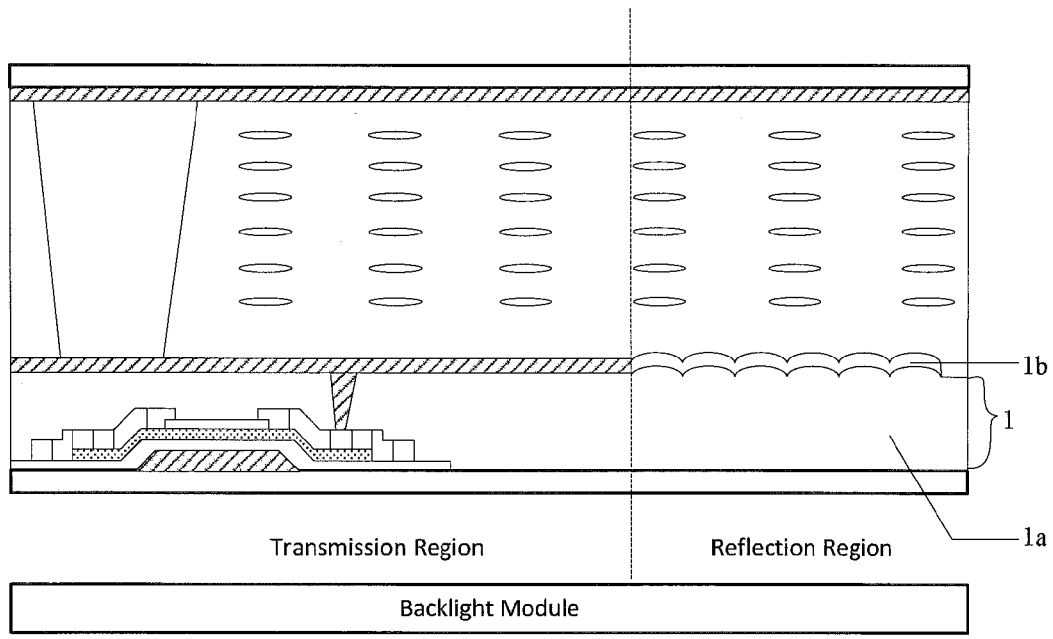
FIG. 1 is a schematic view showing a structure of a conventional transflective liquid crystal panel.

A further description of the invention will be made in detail as below with reference to embodiments of the present invention taken in conjunction with the accompanying drawings. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

According to a general concept of the present invention, there is provided a transflective liquid crystal panel comprising pixel units arranged in a matrix, a transmission region and a reflection region disposed in each pixel unit, and a reflection layer disposed in the reflection region, wherein the reflection layer includes an electronic ink layer.

The reflection layer of the transflective liquid crystal panel according to the embodiment of the present invention comprises the electronic ink layer. For example, the electronic ink layer comprises a plurality of positively charged diffusion particles and a plurality of negatively charged light absorption particles, and the reflection layer further comprises a gelatin layer covering the electronic ink layer. The plurality of diffusion particles in the electronic ink layer can diffuse light.

Since the reflection layer according to the embodiment of the present invention can be formed by printing without needing etching, the process for fabricating the reflection layer is simplified. Furthermore, since an outer surface layer of the reflection layer according to the embodiment of the present invention is formed of the insulating gelatin, there is a less probability that electrostatic charges will be accumulated in the reflection layer. In addition, since a surface of the reflection layer according to the embodiment of the present invention is flat, the reflection layer will not adversely affect orientation of the liquid crystal molecules in the reflection region or the influence is less. As a result, the display effect in the reflection region is improved.

A further description of the invention will be made in detail as below with reference to embodiments of the present invention taken in conjunction with the accompanying drawings. In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the drawings, a thickness of layers or a size and a shape of regions do not reflect a real scale of an array substrate or a color filter substrate, and the only purpose is to schematically show the embodiments of the present invention.

Figure 3A:
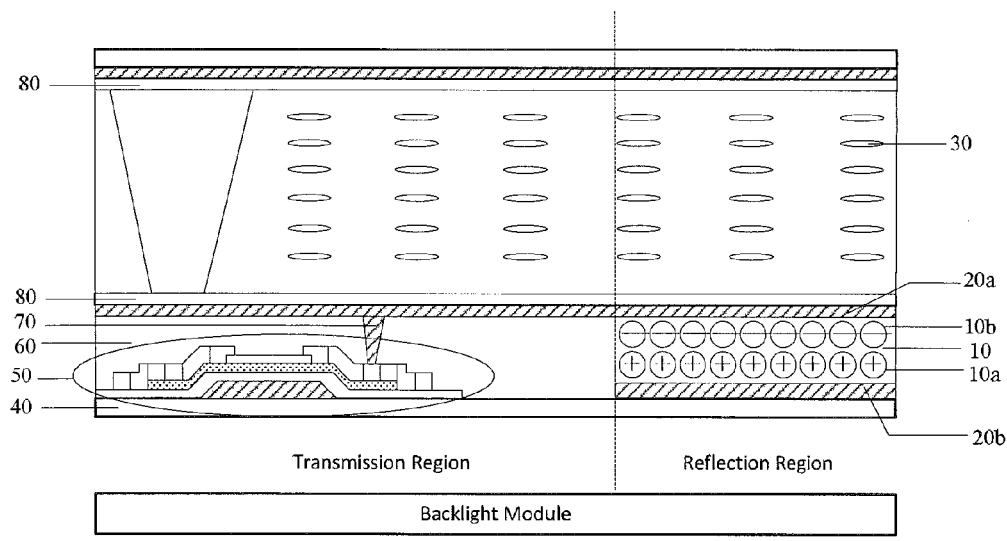
FIGS. 3A-3C are schematic views showing a structure of a transflective liquid crystal panel according to an embodiment of the present invention in which different states of a reflection layer are shown, respectively.

In some exemplary embodiments, as shown in FIG. 3A, the transflective liquid crystal panel comprises pixel units arranged in a matrix, a transmission region and a reflection region disposed in each pixel unit, and a reflection layer 10 disposed in the reflection region. The reflection layer 10 includes an electronic ink layer.

The electronic ink layer will be simply described as below.

In some exemplary embodiments, as shown in FIG. 3A, the electronic ink layer comprises a plurality of positively charged diffusion particles 10a and a plurality of negatively charged light absorption particles 10b, and the reflection layer further comprises a gelatin layer covering the electronic ink layer. Generally, the positively charged diffusion particles may be particles of metal oxide having a nano-scale particle size and may be white, while the negatively charged light absorption particles may be black particles having a nano-scale particle size. The insulating gelatin is a transparent elastomer which can be uniformly applied. The electronic ink may be any appropriate commercially available electronic ink. In addition, instead of the gelatin layer, any other appropriate material layer can be adopted for covering the electronic ink layer.

In some exemplary embodiments, since the electronic ink layer comprises a plurality of diffusion particles 10a, the electronic ink layer can diffuse light. Furthermore, since a shape of the diffusion particles in the electronic ink layer is similar to a spherical shape, a surface of the diffusion particles arranged in the electronic ink layer has an uneven concavo-convex shape so that the diffusion particles in the electronic ink layer can diffuse light.

Since the reflection layer according to the embodiment of the present invention can be formed by printing without needing etching, the process for fabricating the reflection layer is simple. Since an outer surface layer of the reflection layer according to the embodiment of the present invention is formed of the insulating gelatin, there is a less probability that electrostatic charges will be accumulated in the reflection layer. In addition, since a surface of the reflection layer according to the embodiment of the present invention is flat, the reflection layer will not adversely affect orientation of the liquid crystal molecules in the reflection region or the influence is less. As a result, the display effect in the reflection region is improved.

In some exemplary embodiments, the transflective liquid crystal panel according to the embodiment of the present invention may be any transflective liquid crystal panel in which electric fields on both sides of liquid crystal are perpendicular to each other.

In some exemplary embodiments, the transflective liquid crystal panel according to the embodiment of the present invention is a twisted nematic liquid crystal panel.

The twisted nematic liquid crystal panel is more suitable for fabricating a transflective liquid crystal panel, and the process for the twisted nematic transflective liquid crystal panel is simple and mature.

In some exemplary embodiments, as shown in FIG. 3A, the transflective liquid crystal panel according to the embodiment of the present invention comprises a first substrate 40, a second substrate, and a liquid crystal 30 between the first substrate and the second substrate. The pixel units arranged in the matrix are located on a surface of the first substrate 40 facing the liquid crystal.

Figure 2:
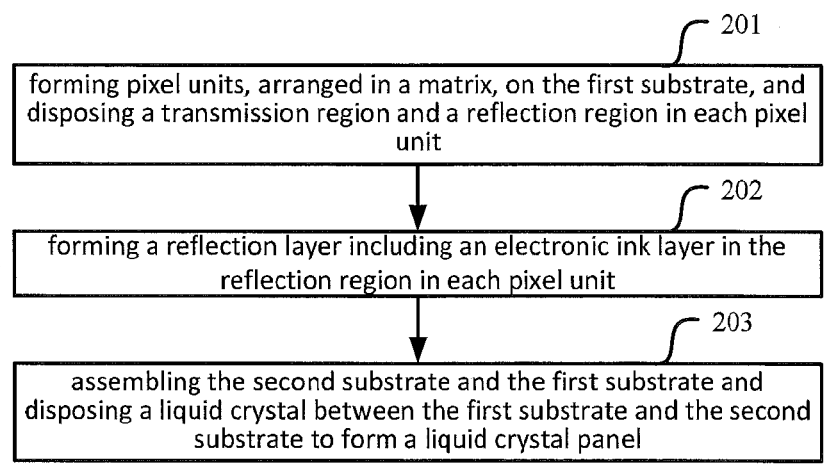
FIG. 2 is a schematic flow diagram of a method of manufacturing a transflective liquid crystal panel according to an embodiment of the present invention.

Base on the same concept, as shown in FIGS. 2A and 3A, according to some exemplary embodiments, there is provided a method of manufacturing a transflective liquid crystal panel comprising:

step 201: forming pixel units, arranged in a matrix, on a first substrate 10, and disposing a transmission region and a reflection region in each pixel unit;

step 202: forming a reflection layer 10 including an electronic ink layer in the reflection region in each pixel unit; and step 203: assembling a second substrate and the first substrate 10 and disposing a liquid crystal 30 between the first substrate and the second substrate to form the liquid crystal panel.

Since the reflection layer of the transflective liquid crystal panel according to the embodiment of the present invention comprises the electronic ink layer, the reflection layer according to the embodiment of the present invention can be formed by printing without needing etching. As a result, the process for fabricating the reflection layer is simple.

Since an outer surface layer of the reflection layer according to the embodiment of the present invention is formed of the insulating gelatin, there is a less probability that electrostatic charges will be accumulated in the reflection layer.

In addition, since a surface of the reflection layer according to the embodiment of the present invention is flat, the reflection layer will not adversely affect orientation of the liquid crystal molecules in the reflection region or the influence is less. As a result, the display effect in the reflection region is improved.

Base on the same concept, according to some exemplary embodiments, there is provided a transflective display device comprising the transflective liquid crystal panel described in the embodiments.

Since the reflection layer of the transflective display device according to the embodiment of the present invention comprises the electronic ink layer, the reflection layer according to the embodiment of the present invention can be formed by printing without needing etching. As a result, the process for fabricating the reflection layer is simple.

Since an outer surface layer of the reflection layer according to the embodiment of the present invention is formed of the insulating gelatin, there is a less probability that electrostatic charges will be accumulated in the reflection layer.

In addition, since a surface of the reflection layer according to the embodiment of the present invention is flat, the reflection layer will not adversely affect orientation of the liquid crystal molecules in the reflection region or the influence is less. As a result, the display effect in the reflection region is improved.

According to some embodiments, as shown in FIG. 3A, a pixel electrode 20a is disposed in each pixel unit to correspond to the transmission region and the reflection region, and the pixel electrode is located on the side of the reflection layer 10 facing the liquid crystal 30.

Figure 4A:
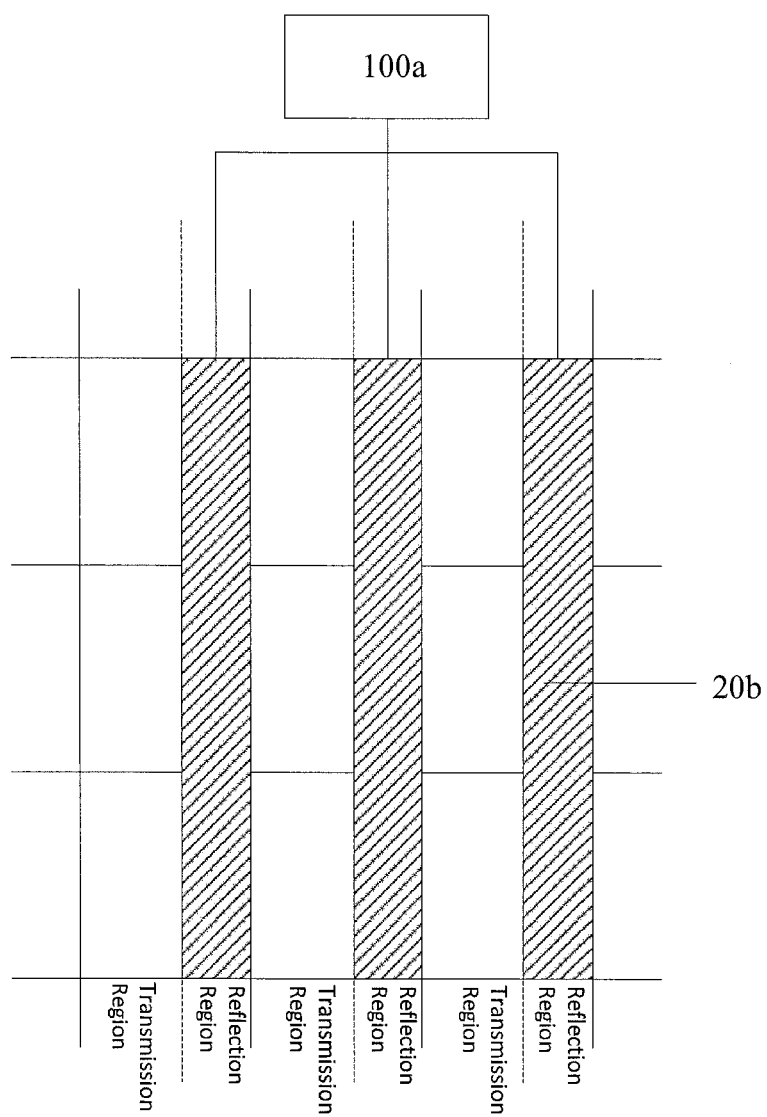
FIG. 4A is a schematic diagram showing a structure of column electrode strips according to an embodiment of the present invention.
Figure 4B:
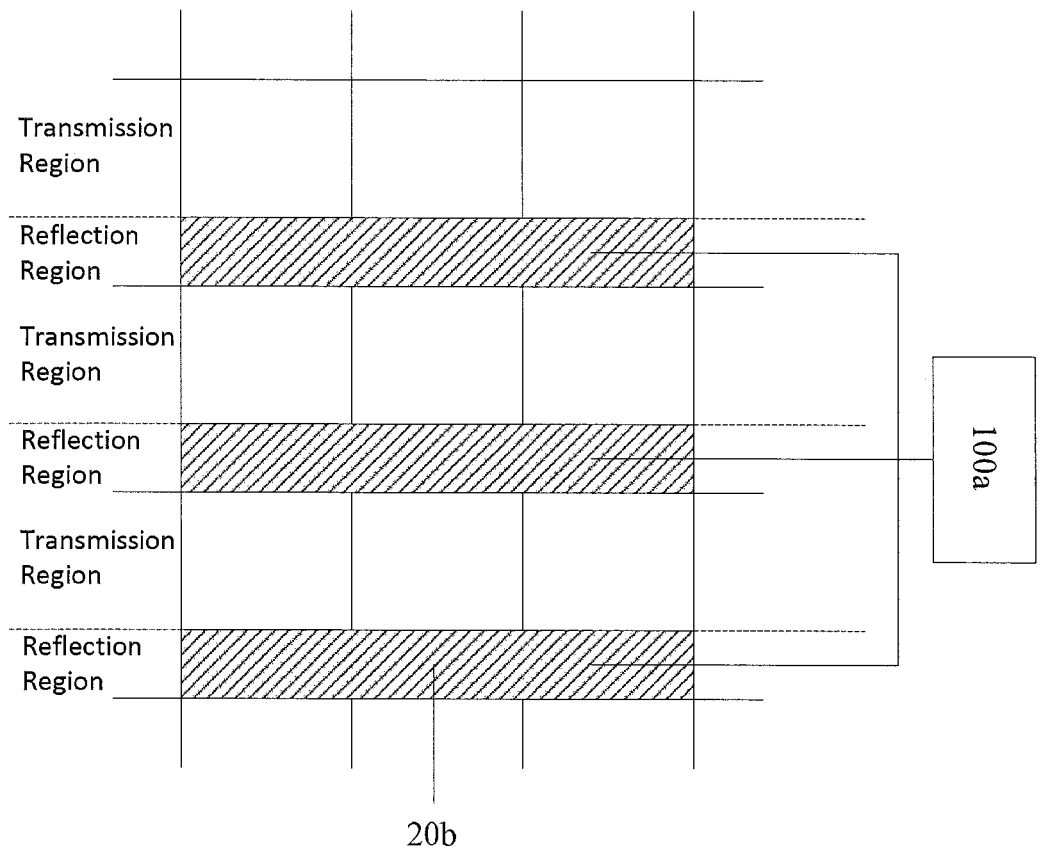
FIG. 4B is a schematic diagram showing a structure of row electrode strips according to an embodiment of the present invention.

As shown in FIG. 4A, the liquid crystal panel further comprises elongated column electrode strips 20b corresponding to the reflection regions of the column pixel units and extending in a vertical direction (the upper-lower direction of FIG. 4A). As shown in FIG. 4B, in an alternative embodiment, the liquid crystal panel comprises elongated row electrode strips (20b corresponding to the reflection regions of the row pixel units and extending in a horizontal direction (the left-right direction of FIG. 4B). The row electrode strips or column electrode strips 20b are located on a side of the reflection layer 10 opposite to the liquid crystal 30.

As shown in FIGS. 4A and 4B, the display device further comprises an electrode strip driver IC 100a electrically connected to each row electrode strip or column electrode strip 20b through electrode leads.

In some exemplary embodiments, the pixel electrode 20a corresponding to the transmission region and reflection region and located on the side of the reflection layer 10 facing the liquid crystal 30 may be served as a first control electrode of the reflection layer 10, and the row or column electrode strip 20b corresponding to the reflection region and located on the other side of the reflection layer 10 opposite to the liquid crystal 30 may be served as a second control electrode of the reflection layer. Rearrangement of the diffusion particles 10a and the light absorption particles 10b in the reflection layer 10, i.e., the electronic ink layer, is controlled by applying a voltage across the first control electrode and the second control electrode of the reflection layer 10.

According to some embodiments, as shown in FIGS. 4A and 4B, the transmission regions and the reflection regions in the pixel units may be arranged in the horizontal direction or the vertical direction, and as the transmission regions and the reflection regions in the pixel units are arranged in different manner, the elongated electrode strips 20b included in the liquid crystal panel are arranged differently as respectively described below.

In some exemplary embodiments, the elongated electrode strips 20b may be fabricated according to arrangement of the transmission regions and the reflection regions in the pixel units, thereby reducing difficulty in fabrication of the elongated electrode strips.

1. The transmission regions and the reflection regions in the pixel units are arranged alternately in the horizontal direction as shown in FIG. 4A.

According to some embodiments, when the transmission regions and the reflection regions in the pixel units are arranged alternately in the horizontal direction, the liquid crystal panel comprises the elongated column electrode strips 20b corresponding to the reflection regions of the column pixel units and extending in the vertical direction.

For example, as shown in FIG. 3A which is a cross sectional view of one pixel unit, the transmission region and the reflection region in the pixel unit are arranged alternately in the horizontal direction. The reflection layer 10 is located in the reflection region. The pixel electrode 20a in the pixel unit is located on the side of the reflection layer 10 facing the liquid crystal 30, and covers the transmission region and the reflection region. The elongated column electrode strip 20b corresponding to the reflection regions of the column pixel units is located on the other side of the reflection layers 10 opposite to the liquid crystal 30.

According to some embodiments, each column of the pixel units is provided with one column electrode strip, or some columns of the pixel units are provided with one column electrode strip.

For example, as shown in FIG. 4A which is a top view of the pixel units arranged in the matrix shape, the transmission region and the reflection region in each pixel unit are arranged alternately in the horizontal direction. Each column of the pixel units are provided with one elongated column electrode strip 20b corresponding to the reflection regions of the column pixel units and extending in the vertical direction.

According to some embodiments, when some columns of the pixel units are provided with one column electrode strip, the elongated column electrode strips corresponding to the reflection regions of the column pixel units may be specifically disposed at intervals of N columns, where N is a natural number, for example more than 2.

2. The transmission regions and the reflection regions in the pixel units are arranged alternately in the vertical direction as shown in FIG. 4B.

According to some embodiments, as shown in FIG. 4B, when the transmission regions and the reflection regions in the pixel units are arranged alternately in the vertical direction, the liquid crystal panel comprises the elongated row electrode strips 20b corresponding to the reflection regions of the row pixel units and extending in the horizontal direction.

According to some embodiments, each row of the pixel units is provided with the row electrode strip, or some rows of the pixel units are provided with one row electrode strips.

For example, as shown in FIG. 4B which is the top view of the pixel units arranged in the matrix shape, the transmission region and the reflection region in each pixel unit are arranged alternately in the vertical direction. Each row of the pixel units are provided with one elongated row electrode strip 20b corresponding to the reflection regions of the row pixel units and extending in the vertical direction.

According to some embodiments, when some rows of the pixel units are provided with one row electrode strip, the elongated row electrode strips corresponding to the reflection regions of the row pixel units may be specifically disposed at intervals of N rows, where N is a natural number, for example more than 2.

According to some embodiments, as shown in FIGS. 4A and 4B, the electrode strip driver IC 100a is electrically connected to each row electrode strip or column electrode strip 20b through the electrode leads to supply a voltage to the row electrode strips or column electrode strips 20b.

According to some embodiments, each pixel unit comprises a thin film transistor (TFT) disposed therein, and the TFT has a gate electrode, a source electrode, and a drain electrode which are electrically connected to a gate line, a data line, and the pixel electrode, respectively.

The display device comprises a gate driver IC electrically connected to each of the gate lines, a source driver IC electrically connected to each of the data lines, and a timing controller electrically connected to the gate driver IC and the source driver IC to control image display.

Figure 5A:
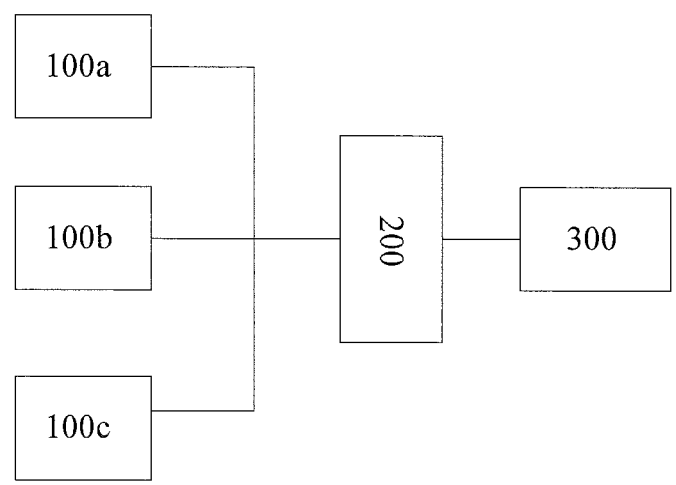
FIGS. 5A-5C are block diagrams showing configurations of transflective display devices according to embodiments of the present invention.

According to some embodiments, as shown in FIG. 5A, the electrode strip driver IC 100a is electrically connected to the timing controller 200 for controlling the image display.

The display device further comprises an external processor electrically connected to the timing controller 200 for outputting a corresponding control signal to the timing controller 200 according to an intensity of an ambient light, such that the timing controller 200 controls the gate driver IC 100b electrically connected to the gate lines, the source driver IC 100c electrically connected to the data lines, and the electrode strip driver IC 100a according to the control signal, respectively.

In some exemplary embodiments, the timing controller 200 controls the gate driver IC and the source driver IC to control voltage values applied to the gate electrodes electrically connected to the gate lines and the source electrodes electrically connected to the data lines, thereby controlling a voltage value of the pixel electrodes electrically connected to the drain electrodes. In addition, the timing controller controls the electrode strip driver IC to control a voltage value applied to the row or column electrode strips. In other words, in the embodiments, the voltage values applied to the pixel electrodes 20a and the row or column electrode strips 20b can be controlled according to the intensity of the ambient light to control the arrangement of the diffusion particles 10a and the light absorption particles 10b in the reflection layer 10, thereby adjusting the brightness of the transmission region and/or the reflection region. As a result, the display effect and performance of the display device are improved.

According to some embodiments, the external processor is specifically configured to output a corresponding control signal to the timing controller 200 according to the intensity of the ambient light when receiving an operational instruction from a user.

In some exemplary embodiments, the brightness of the transmission region and/or the reflection region can be adjusted according to a user's control, thereby improving user's experience comfort.

According to some embodiments, the external processor specifically comprises a light sensor 301, a comparator 303, a switch 302, and an external controller 304.

Figure 5B:
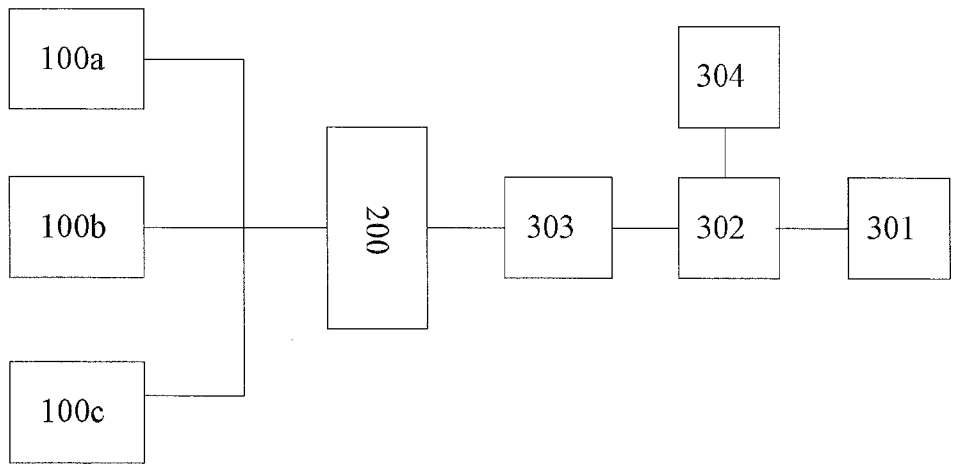

As shown in FIG. 5B, the light sensor 301 is electrically connected to the comparator 303 through the switch 302, the comparator 303 is electrically connected to the timing controller 200, and the external controller 304 is electrically connected to the switch 302 to control the switch 302 to be closed or opened according to a user's operation.

Figure 5C:
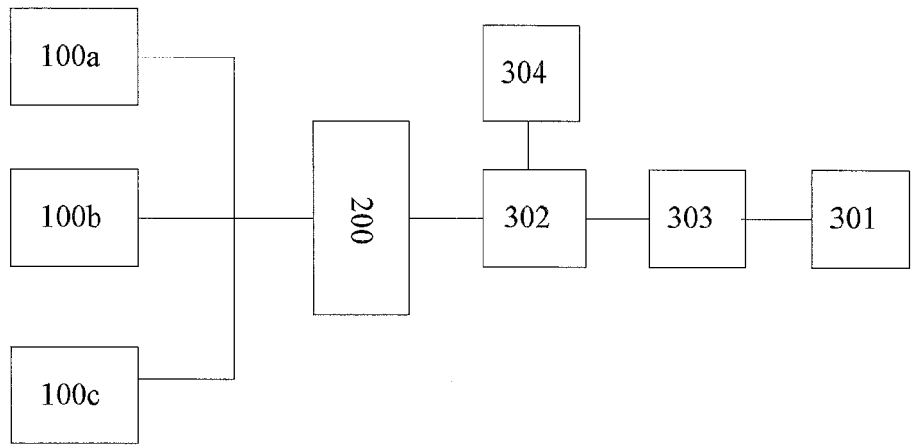

Alternatively, as shown in FIG. 5C, the light sensor 301 is electrically connected to the comparator 303, the comparator 303 is electrically connected to the timing controller 200 through the switch 302, and the external controller 304 is electrically connected to the switch 302 to control the switch 302 to be closed or opened according to a user's operation.

In some exemplary embodiments, the external controller 304 controls the switch 302 to be closed according to a user's operation. The light sensor 301 outputs an electrical signal value obtained from a light signal received by it to the comparator 303. The comparator 303 compares the electrical signal value with a preset signal value threshold to obtain a comparison result and outputs a control signal corresponding to the obtained comparison result to the timing controller 200.

According to some embodiments, the external controller 304 in the embodiment may be any conventional device that can receive an operational instruction from a user and trigger closing or opening of the switch according to the operational instruction received from the user.

In some exemplary embodiments, when the external processor 304 triggers closing of the switch 302 according to the operational instruction received from the user, it can output a corresponding control signal to the timing controller 200 according to the intensity of the ambient light; and when the external processor 304 triggers opening of the switch 302 according to the operational instruction received from the user, it can stop outputting of the control signal corresponding to the intensity of the ambient light to the timing controller 200.

According to some embodiments, the light sensor 301, the comparator 303 and the switch 302 in the embodiment may be embodied in a manner similar to that of the conventional light sensor, comparator and switch and thus are no longer described for the sake of brevity.

It should be noted that the specific configuration of the external processor as shown in FIGS. 5B and 5C is only used to describe and explain the embodiment of the present invention and the present invention is not limited to the configuration, and any other specific configuration that can achieve the function of the external processor in the embodiment may also be applied to the embodiment of the present invention.

It should be noted that the structure of the transflective liquid crystal panel shown in FIG. 3A in the embodiment is only used to describe and explain the embodiment of the present invention and the present invention is not limited to the structure, and any other specific structure of the transflective liquid crystal panel that can achieve the first control electrode and the second electrode respectively located on both sides of the reflection layer 10 is also applicable to the embodiment of the present invention. For example, a layer of column electrode strip corresponding in position to the column electrode strip 20b shown in FIG. 3A is disposed between the pixel electrode 20a and the reflection layer 10 to serve as the first control electrode of the reflection layer, or the column electrode strip 20b shown in FIG. 3A is disposed on a side of the first substrate 40 opposite to the liquid crystal 30.

Figure 6:
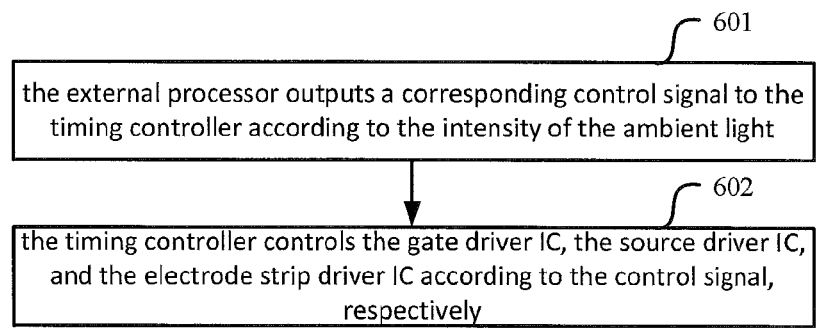
FIG. 6 is a schematic flow diagram of a method of controlling displaying of the transflective display device according to an embodiment of the present invention.

Base on the same concept, as shown in FIG. 6, according to some exemplary embodiments, there is provided a method of controlling displaying of the transflective display device comprising:

step 601: outputting a corresponding control signal to the timing controller by the external processor according to an intensity of an ambient light; and step 602: controlling the gate driver IC, the source driver IC, and the electrode strip driver IC by the timing controller according to the control signal, respectively.

In some exemplary embodiments, the voltage values applied to the pixel electrodes 20a and the row or column electrode strips 20b are controlled according to the intensity of the ambient light to control the arrangement of the diffusion particles 10a and the light absorption particles 10b in the reflection layer 10, thereby adjusting the brightness of the transmission region and/or the reflection region. As a result, the display effect and performance of the display device are improved.

According to some embodiments, in the step 601, the external processor outputs a corresponding control signal to the timing controller 200 according to the intensity of the ambient light when receiving an operational instruction from a user.

In some exemplary embodiments, according to a user's control, the external processor sends a control signal to the timing controller 200 to adjust the brightness of the transmission region and/or the reflection region, thereby improving user's experience comfort.

According to some embodiments, when the external processor has different specific configurations, the processes in which the external processor outputs a corresponding control signal to the timing controller according to the intensity of the ambient light are slightly different from each other. The processes are respectively described below.

1. The external processor specifically comprises: the light sensor 301, the comparator 303, the switch 302, and the external controller 304. The light sensor 301 is electrically connected to the comparator 303 through the switch 302, the comparator 303 is electrically connected to the timing controller 200, and the external controller 304 is electrically connected to the switch 302.

According to some embodiments, in the step 601, the external processor outputs a corresponding control signal to the timing controller 200 according to the intensity of the ambient light. Specifically, the external controller 304 controls the switch 302 to be closed according to a user's operation;

the light sensor 301 outputs an electrical signal value obtained from a light signal received by it to the comparator 303; and the comparator 303 compares the electrical signal value with a first signal value and a second signal value, respectively, to obtain one of three comparison results and outputs a control signal corresponding to the obtained comparison result to the timing controller 200.

2. The external processor specifically comprises: the light sensor 301, the comparator 303, the switch 302, and the external controller 304. The light sensor 301 is electrically connected to the comparator 303, the comparator 303 is electrically connected to the timing controller 200 through the switch 302, and the external controller 304 is electrically connected to the switch 302.

According to some embodiments, in the step 601, the external processor outputs a corresponding control signal to the timing controller 200 according to the intensity of the ambient light. Specifically, the light sensor 301 outputs an electrical signal value obtained from a light signal received by it to the comparator 303; and the comparator 303 compares the electrical signal value with the first signal value and the second signal value, respectively, to obtain one of the three comparison results and determines a control signal corresponding to the obtained comparison result;

the external controller 304 controls the switch 302 to be closed according to a user's operation; and the comparator 303 outputs the determined control signal to the timing controller 200.

In the specific embodiment, the stronger the light signal received by the light sensor 301 is, the more the electrical signal value obtained from the received light signal by the light sensor is; and when the comparator 303 compares the electrical signal value outputted from the light sensor 301 with the first signal value and the second signal value, respectively, there may be three comparison results. The three comparison results are respectively described below.

1. The comparison result obtained by the comparator is that the electrical signal value is less than the first signal value.

According to some embodiments, in the step 602, the timing controller 200 controls the gate driver IC, the source driver IC, and the electrode strip driver IC, respectively. Specifically, the timing controller 200 controls the gate driver IC, the source driver IC, and the electrode strip driver IC, respectively, so that a first voltage value is applied to the pixel electrodes 20a, and a second voltage value is applied to the row electrode strips or column electrode strips 20b.

The first voltage value is greater than the second voltage value and a difference between the second voltage value and the first voltage value is greater than a first difference threshold.

In some exemplary embodiments, when the electrical signal value is less than the first signal value, it means that the ambient light is weak. In this case, the display device is probably located in a non-outdoor environment.

The first voltage value is applied to the pixel electrodes 20a, and the second voltage value is applied to the row electrode strips or column electrode strips 20b. Based on the principle that charges of the same sign repel one another and charges of the opposite sign attract one another, the diffusion particles 10a in the reflection layer 10 are close to the row electrode strips or column electrode strips 20b while the light absorption particles 10b in the reflection layer 10 are close to the pixel electrode 20a as shown in FIG. 3A.

In other words, the arrangement is equivalent to a configuration in which the diffusion particles 10a in the reflection layer 10 are formed directly on the glass substrate 40. The configuration can reduce a loss of backlight to a great extent so that the backlight is reflected to a backlight module. After the backlight is reflected by the backlight module, a part of the backlight is emitted from the transmission region to improve the display brightness of the transmission region and thus the entire display brightness of the pixel unit, thereby increasing the utilization efficiency of the backlight.

2. The comparison result obtained by the comparator is that the electrical signal value is not less than the first signal value and is not greater than the second signal value.

According to some embodiments, in the step 602, the timing controller controls the gate driver IC, the source driver IC, and the electrode strip driver IC, respectively. Specifically, the timing controller 200 controls the gate driver IC, the source driver IC, and the electrode strip driver IC, respectively, so that the second voltage value is applied to the pixel electrodes 20a, and the first voltage value is applied to the row electrode strips or column electrode strips 20b.

In some exemplary embodiments, when the electrical signal value is not less than the first signal value and is not greater than the second signal value, it means that the ambient light is not strong and is not weak and belongs to a normal intensity. In this case, the display device is probably located in an outdoor environment having a normal light intensity.

Figure 3B:
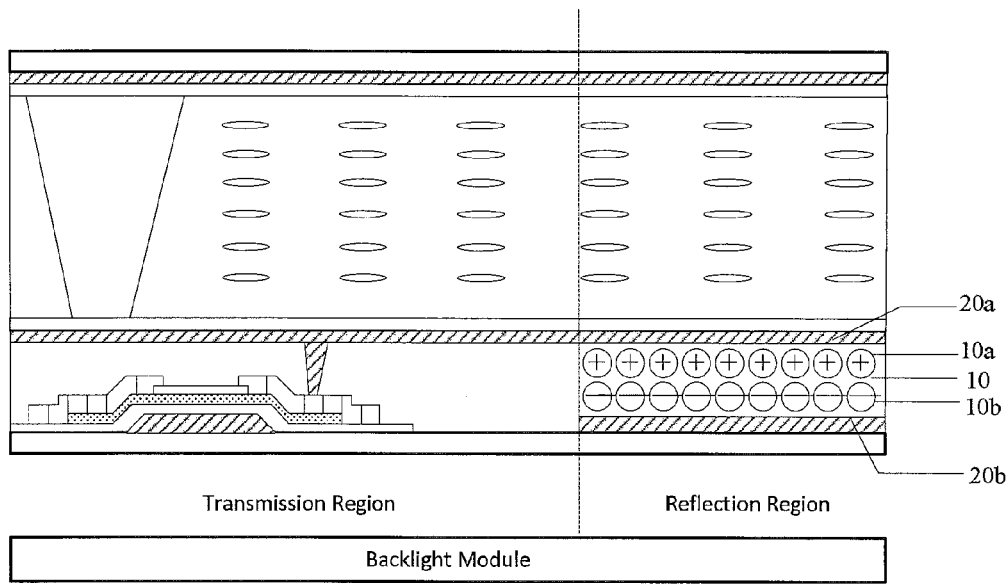

The second voltage value is applied to the pixel electrodes 20a, and the first voltage value is applied to the row electrode strips or column electrode strips 20b. Base on the principle that charges of the same sign repel one another and charges of the opposite sign attract one another, the diffusion particles 10a in the reflection layer 10 are close to the pixel electrodes 20a while the light absorption particles 10b in the reflection layer 10 are close to the row electrode strips or column electrode strips 20b as shown in FIG. 3B.

In other words, the arrangement is equivalent in function to a reflection layer in a conventional reflection region and the reflection layer of the embodiment has an excellent diffusion function for the ambient light.

3. The comparison result obtained by the comparator is that the electrical signal value is greater than the second signal value.

According to some embodiments, in the step 602, the timing controller 200 controls the gate driver IC, the source driver IC, and the electrode strip driver IC, respectively. Specifically, the timing controller 200 controls the gate driver IC, the source driver IC, and the electrode strip driver IC, respectively, so that the third voltage value is applied to the pixel electrodes 20a, and the fourth voltage value is applied to the row electrode strips or column electrode strips 20b.

An absolute value of a difference between the third voltage value and the fourth voltage value is less than a second difference threshold, and the second difference threshold is less than the first different threshold.

In some exemplary embodiments, when the electrical signal value is greater than the second signal value, it means that the ambient light is strong. In this case, the display device is probably located in an outdoor environment having a high light intensity.

Figure 3C:
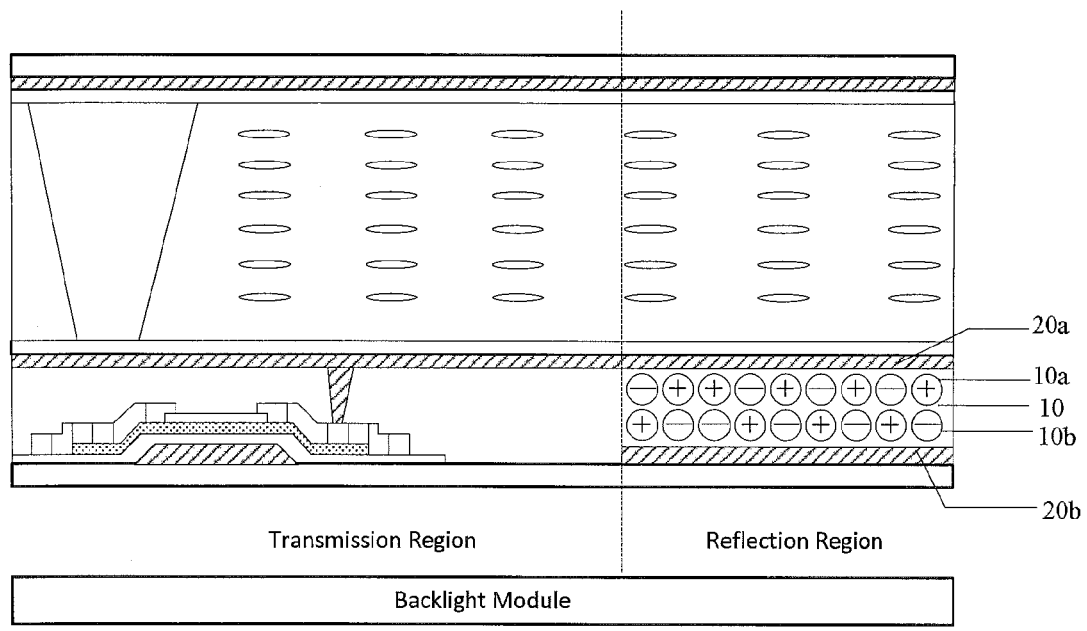

The third voltage value is applied to the pixel electrodes 20a, and the fourth voltage value is applied to the row electrode strips or column electrode strips 20b. Based on the principle that charges of the same sign repel one another and charges of the opposite sign attract one another, some of the diffusion particles 10a and some of the light absorption particles 10b in the reflection layer 10 are close to the pixel electrodes 20a while some or the others of the diffusion particles 10a and the others or some of the light absorption particles 10b in the reflection layer 10 are close to the row electrode strips or column electrode strips 20b as shown in FIG. 3C.

In other words, the close or same voltage values are applied to the pixel electrodes 20a and the row or column electrode strips 20b such that the diffusion particles 10a and the light absorption particles 10b are arranged on both sides of the reflection layer. The light absorption particles arranged on the side of the reflection layer facing the liquid crystal can absorb a part of the ambient light to reduce the display brightness of the reflection region, and the diffusion particles arranged on the side of the reflection layer opposite to the liquid crystal can reflect the backlight such that the backlight can be reused to improve the display brightness of the transmission region. As a result, the display brightness of the transmission region and the display brightness of the reflection region can be adjusted so that a difference between the display brightness of the transmission region and the display brightness of the reflection region can be reduced and the display effect and performance of the display device are improved.

According to some embodiments, the voltage values applied to the pixel electrodes 20a and the row or column electrode strips 20b are controlled so that the difference between the brightness of the transmission region and the brightness of the reflection region is adjusted for accommodating outdoor environments having different ambient light intensities. The control electrodes are configured to control a ratio of the number of those, close to one of the control electrodes, of the plurality of positively charged diffusion particles to the number of those, close to the one of the control electrodes, of the plurality of negatively charged light absorption particles.

According to some embodiments, after the step 602, the method further comprises:

After a preset period of time has elapsed, the external controller 304 stops, according to the operational instruction received from the user, outputting of the control signal corresponding to the intensity of the ambient light to the timing controller 200.

In some exemplary embodiments, it can be ensured that after the preset period of time has elapsed, the timing controller 200 controls normal displaying of images.

In some exemplary embodiments, since the reflection layer (the electronic ink) is bistable, it only needs to be instantaneously charged and does not need a sustaining voltage. Therefore, after the preset period of time has elapsed, the reflection layer can be maintained in a stable state into which it is brought when it is charged.

According to some embodiments, when the external processor specifically comprises the light sensor 301, the comparator 303, the switch 302, and the external controller 304, the external processor stops, according to the operational instruction received from the user, outputting of the control signal corresponding to the intensity of the ambient light to the timing controller 200. Specifically, the external processor 304 controls, according to a user's operation, the switch 302 to be opened to stop outputting of the control signal corresponding to the intensity of the ambient light to the timing controller 200.

According to some embodiments, the preset period of time is a period of time during which the switch is in a closed state. The preset period of time can be set empirically or according to requirements. For example, the preset period of time is set to be not less than 1 millisecond empirically or according to requirements.

In order to clearly explain a method of manufacturing a transflective liquid crystal panel according to an embodiment of the present invention in detail, the method is explained by one specific embodiment as follows.

Embodiment 1

In the first embodiment, the method of manufacturing a transflective liquid crystal panel according to an embodiment of the present invention is explained by taking a method of manufacturing the transflective liquid crystal panel shown in FIG. 3A as an example.

In step A1, pixel units, arranged in a matrix, are formed on a first substrate 40, and a transmission region and a reflection region are disposed in each pixel unit.

As shown in FIG. 3A, the transmission region and the reflection region are disposed in one pixel unit on the first substrate 40.

In step A2, TFTs 50 each including a gate electrode, a source electrode, and a drain electrode are formed in the transmission regions, and elongated column electrode strips 20b corresponding to the reflection regions of column pixel units are formed in the reflection regions.

As shown in FIG. 3A, the TFTs 50 are located in the transmission regions while the elongated column electrode strips 20b are located in the reflection regions.

In step A3, a layer of electronic ink is printed on the column electrode strips 20 in the reflection regions as a reflection layer 10, and a planarization layer 60 is formed in the transmission regions to cover the TFTs 50 and to have an upper surface flush with an upper surface of the electronic ink layer.

As shown in FIG. 3A, the reflection layer 10 is located in the reflection regions, and the planarization layer 60 is located in the transmission regions.

In step A4, a via hole 70 is formed in the planarization layer to expose a drain electrode of the TFT 50.

In step A5, a pixel electrode 20a is formed to cover the planarization layer and the electronic ink layer and to be electrically connected to the drain electrode through the via hole.

As shown in FIG. 3A, the pixel electrode 20a is electrically connected to the drain electrode of the TFT 50 through the via hole 70.

In step A6, an orientation layer 80 is applied on the pixel electrode.

As shown in FIG. 3A, the orientation layer 80 is formed on the pixel electrode.

In step A7, a second substrate formed with another orientation layer 80 and the first substrate 40 are assembled and a liquid crystal 30 is disposed between the first substrate and the second substrate to form a liquid crystal panel.

As shown in FIG. 3A, the liquid crystal 30 is disposed between the second substrate formed with the another orientation layer 80 and the first substrate 40.

The above embodiments are only used to explain the present invention, and should not be construed to limit the present invention. It will be understood by those skilled in the art that various changes and modifications may be made therein without departing from the spirit of the present invention, the scope of which is defined in the appended claims and their equivalents.

The invention claimed is:

1. A transflective liquid crystal panel, comprising:
   pixel units arranged in a matrix,
   a transmission region and a reflection region disposed in each pixel unit;
   a reflection layer disposed in the reflection region, wherein the reflection layer includes an electronic ink layer,
   wherein the electronic ink layer comprises a plurality of positively charged diffusion particles and a plurality of negatively charged light absorption particles; and
   control electrodes disposed on a first side and a second side of the electronic ink layer to control the plurality of positively charged diffusion particles and the plurality of negatively charged light absorption particles of the electronic ink layer, so as to control arrangement of the diffusion particles and the light absorption particles in the reflection layer according to intensity of ambient light, thereby adjusting display brightness of the transmission region and/or the reflection region.

2. The transflective liquid crystal panel of claim 1, wherein the liquid crystal panel is a twisted nematic liquid crystal panel.

3. The transflective liquid crystal panel of claim 1, wherein the positively charged diffusion particles are white particles having a nano-scale particle size, and the negatively charged light absorption particles are black particles having a nano-scale particle size.

4. The transflective liquid crystal panel of claim 1, wherein the reflection layer further comprises a gelatin layer covering the electronic ink layer.

5. The transflective liquid crystal panel of claim 1, wherein:
   the control electrodes are configured to control the plurality of positively charged diffusion particles and the plurality of negatively charged light absorption particles such that the plurality of positively charged diffusion particles are close to one of the control electrodes and the plurality of negatively charged light absorption particles are close to the other of the control electrodes; or the control electrodes are configured to control a ratio of the number of those, close to one of the control electrodes, of the plurality of positively charged diffusion particles to the number of those, close to the one of the control electrodes, of the plurality of negatively charged light absorption particles.

6. A transflective display device, comprising the transflective liquid crystal panel according to claim 1.

7. The transflective display device of claim 6, wherein:
   a pixel electrode is disposed in each pixel unit to correspond to the transmission region and the reflection region, and the pixel electrode is located on a side of the reflection layer facing a liquid crystal;
   the liquid crystal panel further comprises elongated column electrode strips corresponding to the reflection regions of the column pixel units, or elongated row electrode strips corresponding to the reflection regions of the row pixel units, wherein the row electrode strips or column electrode strips are located on the other side of the reflection layer opposite to the liquid crystal; and
   the display device further comprises an electrode strip driver IC electrically connected to each row electrode strip or column electrode strip through electrode leads, wherein the pixel electrode is served as one of control electrodes for controlling the plurality of positively charged diffusion particles and the plurality of negatively charged light absorption particles of the electronic ink layer, and the row electrode strip or column electrode strip is served as the other of the control electrodes.

8. The transflective display device of claim 7, wherein each column/row of the pixel units is provided with one column/row electrode strip, or some columns/rows of the pixel units are provided with one column/row electrode strips.

9. The transflective display device of claim 7, further comprising:
   a timing controller configured to control image display, wherein the electrode strip driver IC is electrically connected to the timing controller; and
   an external processor electrically connected to the timing controller for outputting a corresponding control signal to the timing controller according to an intensity of an ambient light, such that the timing controller controls a gate driver IC electrically connected to gate lines, a source driver IC electrically connected to data lines, and the electrode strip driver IC according to the control signal, respectively.

10. The transflective display device of claim 9, wherein:
    the external processor comprises a light sensor, a comparator, a switch, and an external controller;
    the light sensor is electrically connected to the comparator through the switch and the comparator is electrically connected to the timing controller, or the light sensor is electrically connected to the comparator and the comparator is electrically connected to the timing controller through the switch;

wherein the external controller is electrically connected to the switch to control the switch to be closed or opened according to a user's operation.

11. The transflective display device of claim 9, wherein:

the external processor outputs a corresponding control signal to the timing controller according to the intensity of the ambient light; and the timing controller controls the gate driver IC, the source driver IC, and the electrode strip driver IC according to the control signal, respectively.

12. The transflective display device of claim 11, wherein:

the external processor comprises a light sensor, a comparator, a switch, and an external controller; and when the light sensor is electrically connected to the comparator through the switch, the external processor outputs a corresponding control signal to the timing controller according to the intensity of the ambient light such that:

the external controller controls the switch to be closed according to a user's operation;

the light sensor outputs an electrical signal value obtained from a light signal received by it to the comparator; and the comparator compares the electrical signal value with a first signal value and a second signal value, respectively, to obtain one of three comparison results and outputs a control signal corresponding to the obtained comparison result to the timing controller.

13. The transflective display device of claim 12, wherein:

if the comparison result obtained by the comparator is that the electrical signal value is less than the first signal value, the timing controller controls the gate driver IC, the source driver IC, and the electrode strip driver IC, respectively, such that a first voltage value is applied to the pixel electrodes, and a second voltage value is applied to the row electrode strips or column electrode strips;

if the comparison result obtained by the comparator is that the electrical signal value is not less than the first signal value and is not greater than the second signal value, the timing controller controls the gate driver IC, the source driver IC, and the electrode strip driver IC, respectively, such that the second voltage value is applied to the pixel electrodes, and the first voltage value is applied to the row electrode strips or column electrode strips; and if the comparison result obtained by the comparator is that the electrical signal value is greater than the second signal value, the timing controller controls the gate driver IC, the source driver IC, and the electrode strip driver IC, respectively, such that a third voltage value is applied to the pixel electrodes, and a fourth voltage value is applied to the row electrode strips or column electrode strips;

wherein the first voltage value is greater than the second voltage value and a difference between the first voltage value and the second voltage value is greater than a first difference threshold; and an absolute value of a difference between the third voltage value and the fourth voltage value is less than a second difference threshold, and the second difference threshold is less than the first different threshold.

14. The transflective display device of claim 12, wherein:

if the comparison result obtained by the comparator is that the electrical signal value is less than the first signal value, the timing controller controls the gate driver IC, the source driver IC, and the electrode strip driver IC, respectively, such that a first voltage value is applied to the pixel electrodes, and a second voltage value is applied to the row electrode strips or column electrode strips, such that the diffusion particles in the reflection layer are close to the row electrode strips or column electrode strips while the light absorption particles in the reflection layer are close to the pixel electrode;

if the comparison result obtained by the comparator is that the electrical signal value is not less than the first signal value and is not greater than the second signal value, the timing controller controls the gate driver IC, the source driver IC, and the electrode strip driver IC, respectively, such that the second voltage value is applied to the pixel electrodes, and the first voltage value is applied to the row electrode strips or column electrode strips, such that the diffusion particles in the reflection layer are close to the pixel electrodes while the light absorption particles in the reflection layer are close to the row electrode strips or column electrode strips; and if the comparison result obtained by the comparator is that the electrical signal value is greater than the second signal value, the timing controller controls the gate driver IC, the source driver IC, and the electrode strip driver IC, respectively, such that a third voltage value is applied to the pixel electrodes, and a fourth voltage value is applied to the row electrode strips or column electrode strips, such that some of the diffusion particles and some of the light absorption particles in the reflection layer are close to the pixel electrodes while the others or some of the diffusion particles and the others or some of the light absorption particles in the reflection layer are close to the row electrode strips or column electrode strips;

wherein the first voltage value is greater than the second voltage value and a difference between the first voltage value and the second voltage value is greater than a first difference threshold; and an absolute value of a difference between the third voltage value and the fourth voltage value is less than a second difference threshold, and the second difference threshold is less than the first different threshold.

15. A method of manufacturing a transflective liquid crystal panel, comprising:

providing a first substrate and a second substrate;

forming pixel units, arranged in a matrix, on the first substrate, and disposing a transmission region and a reflection region in each pixel unit;

forming a reflection layer including an electronic ink layer in the reflection region in each pixel unit; and assembling the second substrate and the first substrate and disposing a liquid crystal between the first substrate and the second substrate, wherein the electronic ink layer comprises a plurality of positively charged diffusion particles and a plurality of negatively charged light absorption particles, wherein the method further comprises providing control electrodes on a first side and a second side of the electronic ink layer to control the plurality of positively charged diffusion particles and the plurality of negatively charged light absorption particles of the electronic ink layer, so as to control arrangement of the diffusion particles and the light absorption particles in the reflection layer according to intensity of ambient light, thereby adjusting display brightness of the transmission region and/or the reflection region.

16. The method of claim 15, wherein the positively charged diffusion particles are white particles having a nano-scale particle size, and the negatively charged light absorption particles are black particles having a nano-scale particle size.

17. The method of claim 15, wherein the reflection layer further comprises a gelatin layer covering the electronic ink layer.

18. The transflective liquid crystal panel of claim 1, wherein:
the control electrodes control the plurality of positively charged diffusion particles and the plurality of negatively charged light absorption particles of the electronic ink layer, such that:
if the ambient light is weak, the diffusion particles are close to the first side while the light absorption particles are close to the second side so that the diffusion particles reflect backlight from the first side, thereby improving the display brightness of the transmission region;
if the ambient light is moderate, the diffusion particles are close to the second side while the light absorption particles are close to the first side so that the diffusion particles reflect the ambient light from the second side; and
if the ambient light is strong, some of the diffusion particles and some of the light absorption particles are close to the first side while some or the others of the diffusion particles and the others or some of the light absorption particles are close to the second side, so that the light absorption particles on the second side absorb a part of the ambient light from the second side to reduce the display brightness of the reflection region, and the diffusion particles on the first side reflect the backlight from the first side to improve the display brightness of the transmission region.

19. The method of claim 15, wherein:
the control electrodes control the plurality of positively charged diffusion particles and the plurality of negatively charged light absorption particles of the electronic ink layer, such that:
if the ambient light is weak, the diffusion particles are close to the first side while the light absorption particles are close to the second side so that the diffusion particles reflect backlight from the first side, thereby improving the display brightness of the transmission region;
if the ambient light is moderate, the diffusion particles are close to the second side while the light absorption particles are close to the first side so that the diffusion particles reflect the ambient light from the second side; and
if the ambient light is strong, some of the diffusion particles and some of the light absorption particles are close to the first side while some or the others of the diffusion particles and the others or some of the light absorption particles are close to the second side, so that the light absorption particles on the second side absorb a part of the ambient light from the second side to reduce the display brightness of the reflection region, and the diffusion particles on the first side reflect the backlight from the first side to improve the display brightness of the transmission region.

* * * * *